US009972956B2

(12) United States Patent
Heim et al.

(10) Patent No.: US 9,972,956 B2
(45) Date of Patent: May 15, 2018

(54) CONNECTING ELEMENT HAVING A RECESSED PORTION ON TOP OF ONE END AND A RECESSED PORTION ON BOTTOM OF THE OTHER END

(71) Applicant: Schaeffler Technologies AG & Co. KG, Herzogenaurach (DE)

(72) Inventors: Jens Heim, Bergrheinfeld (DE); Sergej Mensch, Schwebheim (DE); Andreas Schiffler, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days. days.

(21) Appl. No.: 15/506,567

(22) PCT Filed: Feb. 3, 2016

(86) PCT No.: PCT/DE2016/200065
§ 371 (c)(1),
(2) Date: Feb. 24, 2017

(87) PCT Pub. No.: WO2016/124192
PCT Pub. Date: Aug. 11, 2016

(65) Prior Publication Data
US 2017/0288358 A1    Oct. 5, 2017

(30) Foreign Application Priority Data
Feb. 6, 2015    (DE) .................. 10 2015 202 127

(51) Int. Cl.
*H01R 39/00* (2006.01)
*H01R 39/64* (2006.01)
*F16C 41/00* (2006.01)

(52) U.S. Cl.
CPC ......... *H01R 39/643* (2013.01); *F16C 41/002* (2013.01)

(58) Field of Classification Search
CPC ....... H01R 39/00; H01R 39/64; H01R 39/643
(Continued)

(56) References Cited
U.S. PATENT DOCUMENTS 3,940,200 A * 2/1976 Schreffler ............ H01R 39/643
439/17
5,057,032 A * 10/1991 Kaufman ............. H01R 12/721
439/326
(Continued)

FOREIGN PATENT DOCUMENTS

WO    2010070392    6/2010
WO    2013005067    1/2013
(Continued)

OTHER PUBLICATIONS

English Translation of the incoming written opinion for PCT/DE2016/200065, 6 pages, dated Jun. 3, 2016.*

*Primary Examiner* — Chandrika Prasad
(74) *Attorney, Agent, or Firm* — Volpe and Koenig, P.C.

(57) ABSTRACT

The present invention relates to a connecting element for electrical and mechanical connection of electronics modules. The connecting element includes a base part having a receptacle area that serves to hold an electronics module, wherein the receptacle area has first electrical contact points for the electrical connection of the connecting element to electrical contact points of the electronics module. The base part includes a first end region having a first recessed section on the top side and has a second end region having a second recessed section on the bottom side. Second electrical contact points for connecting to further connecting elements are disposed on the top side of the first recessed section and on the bottom side of the second recessed section. The recessed sections are designed such that the end regions of connecting elements that are located next to each other can be positioned opposite one another in such a way that the top sides of the connecting elements are located on a plane and the
(Continued)

bottom sides of the connecting elements are located on another plane. The second electrical contact points are disposed in such a way that the connecting elements can be positioned at different angles (a) with respect to one another. The invention also relates to an electronic module arrangement having at least one connecting element and an electronics module disposed in the receptacle area of the connecting element.

10 Claims, 2 Drawing Sheets

(58) Field of Classification Search
USPC .......... 439/10, 11, 13, 18, 19, 22, 23, 27, 28
See application file for complete search history.

(56) References Cited

U.S. PATENT DOCUMENTS

| | | | |
|---|---|---|---|
| 5,984,687 A * | 11/1999 | Schwarz | H01R 39/643 439/17 |
| 6,489,702 B1 * | 12/2002 | Bartman | H01R 39/12 310/219 |
| 7,425,825 B2 * | 9/2008 | Kang | G01D 5/145 324/207.2 |
| 2005/0081646 A1 * | 4/2005 | Heim | G01L 5/0019 73/862.49 |
| 2008/0152272 A1 * | 6/2008 | Debrailly | F16C 19/54 384/448 |
| 2008/0211488 A1 * | 9/2008 | Kang | G01D 5/145 324/207.2 |
| 2015/0104958 A1 * | 4/2015 | Fowler | H01J 37/32577 439/17 |
| 2015/0369279 A1 * | 12/2015 | Heim | G01L 5/0009 384/448 |
| 2017/0261037 A1 * | 9/2017 | Schiffler | F16C 41/002 |

FOREIGN PATENT DOCUMENTS

| | | |
|---|---|---|
| WO | 2013005068 | 1/2013 |
| WO | 2013050801 | 4/2013 |

\* cited by examiner

CONNECTING ELEMENT HAVING A RECESSED PORTION ON TOP OF ONE END AND A RECESSED PORTION ON BOTTOM OF THE OTHER END

BACKGROUND

The present invention relates to a connecting element for the electrical connection of electronics modules. The invention further relates to an electronics module arrangement for installation in a cylindrical installation space and to a rolling bearing arrangement with such connecting elements.

The area of use of the connecting element according to the invention and the electronics module arrangement concerns applications in which electronics modules that can realize different functions are to be installed in cylindrical installation spaces with different diameters. The installation space is hereby uniquely described by the parameters: inner diameter, outer diameter, and height. An electronics module is defined by its outer geometry, its contacts, and functionality. Electronics modules are, for example, sensors, actuators, signal processing devices, and data storage devices.

According to the current state of the art, electrical measurement devices or additional electronics components are typically designed and used for a predefined size for installation in cylindrical installation spaces, for example, in rolling bearings. Their shape is dependent, in particular, on the diameter of the installation space. This has the big disadvantage that solutions designed for a certain installation space diameter cannot be used for different installation space diameters. Therefore, for different installation space diameters, different solutions must be provided.

WO 2013/050801 A1 shows a sensor arrangement for installation in a rolling bearing installation space with a sensor body and multiple sensor cells. Every sensor cell is connected to a connecting element that is mounted on the sensor body. The connecting element is used to supply power to the sensor cells and to transmit sensor data. The connecting element comprises connecting contacts with elastically deformable connectors for realizing a crimped connection to the connecting element. The connecting contacts also have elastically deformable bushings for producing a crimped connection to a sensor cell.

WO 2010/070392 describes a rolling bearing arrangement with an encoder washer connected locked in rotation to the rotating bearing ring and multiple sensors for detecting a rotational parameter of the encoder washer and mechanical adjusting means for setting the radial distance between the encoder washer and each individual sensor. The sensors can be arranged on a flexible circuit board that is arranged, in turn, in a body. The body has recesses for holding the sensors. Alternatively, the sensors are connected to each other by means of flexible electrical conductors and arranged with these conductors within the body.

In WO 2013/005067 A1, a sensor arrangement integrated in a rolling bearing is described for determining the angular position of a rotating component. The sensor arrangement comprises a sensor body that is used for holding sensor cells arranged circumferentially around a rotational axis. Every sensor cell is connected to a signal processing unit of the sensor arrangement by means of electrical connecting means.

WO 2013/005068 A1 shows a set of sensor units for detecting the angular position of a rotating element with respect to a fixed element. Every sensor unit comprises a sensor body that is equipped with a number of sensor cells arranged circumferentially around its rotational axis. Each sensor cell is connected to a signal processing unit. The sensor units of the set comprise identical sensor units and signal processing units. In addition, the sensor units contain different coding elements and electrical connection devices that are each adapted to different sizes of the rotating element.

SUMMARY

The objective of the present invention is to provide a connecting element for the electrical and mechanical connection of electronics modules. The connecting element is to enable an integration of electronics modules in cylindrical installation spaces with different installation space diameters. In addition, an electronics module arrangement and a rolling bearing arrangement with an installed electronics module arrangement are also to be disclosed.

To achieve this objective according to the invention, first a connecting element according to the invention is used.

The connecting element according to the invention comprises a base part with a receptacle area used for holding an electronics module. The receptacle area has first electrical contact points for connecting the connecting element to electrical contact points of the electronics module. The base part has a first end region with a first recessed section on its top side and a second end region with a second recessed section on its bottom side. On the top side of the first recessed section and on the bottom side of the second recessed section there are second electrical contact points for connecting to other connecting elements. By the use of the second electrical contact points, the connecting elements are preferably connected to each other both electrically and also mechanically. The recessed sections are constructed such that the end regions of connecting elements in line with each other can be positioned opposite each other such that the top sides and the bottom sides of the connecting elements are in a plane. The second contact points arranged at opposite end regions of a connecting element thus point in opposite directions. To transport electrical signals or energy between the electronics modules, obviously there are electrical connections between the first and the second electrical contact points of each connecting element. These electrical connections can be constructed in the simplest case as fixed conductor paths. For improved variability, the connections can also be varied, for example, by the provision of conductive bridges, solder points, or similar adaptable sections.

The second electrical contact points are arranged so that the connecting elements can be positioned in different angles relative to each other. In particular, the second contact points are arranged on respective recessed sections along a circular path and form ring segments electrically separated from each other.

One essential advantage of the solution according to the invention is to be seen in that through the ability to position the connecting elements in different angles relative to each other, a simple adaptation of the connecting elements connected to each other to different installation space diameters is possible. By use of the connecting elements, an arbitrary number of electronics modules can be connected to each other with minimal expense.

The connecting element can preferably also have, in addition to mechanical interfaces and electrical interfaces, functional interfaces and/or material interfaces that are compatible with corresponding interfaces of the electronics modules or other components.

According to one advantageous embodiment, the connecting element comprises a positioning element for positioning the connecting element in a carrier. In this way, a uniform mechanical positioning of the connecting element and electronics module in the carrier is enabled with minimal expense.

The second electrical contact points of adjacent connecting elements can be preferably connected electrically and preferably also mechanically by means of conductive adhesive, soldering, press-fit connection, welding, or crimping.

The objective according to the invention is also achieved by an electronics module arrangement according to the invention. The electronics module arrangement according to the invention comprises at least one connecting element of the type described above and an electronics module arranged in the receptacle area of the connecting element. Preferably, however, the electronics module arrangement comprises multiple connecting elements connected to each other by means of the second contact points and multiple electronics modules. The maximum number of electronics modules here corresponds to the number of connecting elements.

According to the invention, electronics modules can be combined arbitrarily with each other, wherein the electronics module arrangement can be used in numerous product variants. In this way, a modular system for a wide array of intended uses can be provided.

According to one advantageous embodiment, the electrical contact points of the electronics modules are formed of an electrically conductive material. Alternatively, the electrical contact points can also be realized by means of an electrically conductive coating. The electrical contact points of the electronics modules are preferably connected to the first electrical contact points of the connecting elements by means of a connector element made from an electrically conductive material, wherein the mechanical connection of electronics module and connecting element is also preferably produced by means of the electrical connection. The connector element is preferably realized as a metallic alloy (silver-tin solder), composite in an organic matrix (conductive adhesive) or as an individual metal (bonding wire).

It has proven useful to equip the electronics module arrangement with a hollow-cylindrical carrier adapted in diameter to the cylindrical installation space, wherein this carrier can be inserted into the installation space. The connecting elements connected to each other are arranged in the carrier in the circumferential direction. The carrier here takes over merely the task of mechanical fastening of the connecting elements connected to each other relative to the rotational axis of the cylindrical installation space. By use of the carrier, a fixed local positioning of the connecting elements and thus also of the electronics modules relative to the carrier in all degrees of freedom is provided. For adapting to different installation space diameters, carriers with different diameters that are adapted to the typical installation spaces can be provided, wherein these carriers can be combined as needed with the electronics modules required for the respective intended use and connected by means of connecting elements.

The connecting elements and/or the electronics modules have recesses for positioning the connecting element and electronics module relative to each other. These recesses simultaneously save axial installation space, because the respective electronics module can be countersunk into the thickness of the connecting element.

To achieve the objective according to the invention, a rolling bearing arrangement according to the invention is also used. The rolling bearing arrangement comprises a rolling bearing with two concentric bearing rings and rolling bodies arranged between the bearing rings in a rolling body space and also an electronics module arrangement of the type described above arranged in the rolling bearing installation space.

BRIEF DESCRIPTION OF THE DRAWINGS

Preferred embodiments of the invention are explained in more detail below using the appended figures. Shown are.

DETAILED DESCRIPTION OF THE PREFERRED EMBODIMENTS

Figure 1:
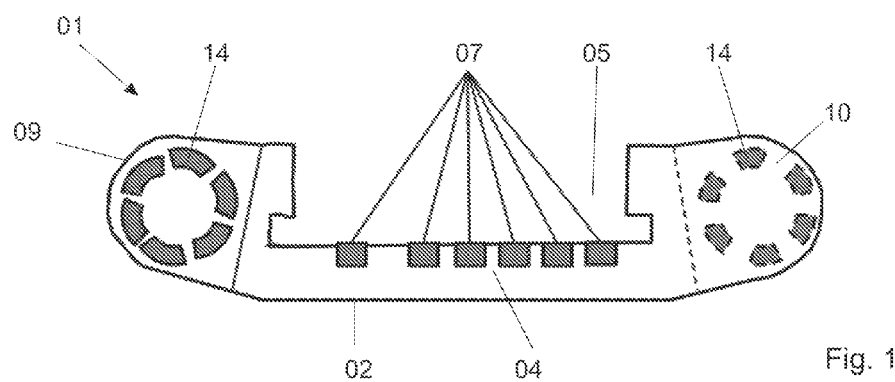
FIG. 1 a top view of a connecting element according to the invention.
Figure 2:
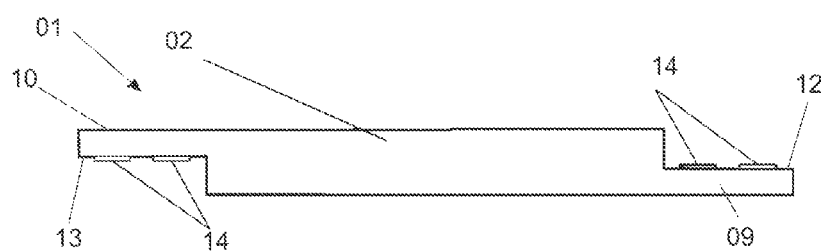
FIG. 2 a side view of the connecting element according to the invention.

FIG. 1 shows a top view of an exemplary embodiment of a connecting element 01 according to the invention, while FIG. 2 shows a side view of the connecting element 01. The connecting element 01 comprises a base part 02 with a receptacle area 04 used for holding an electronics module 03 (see FIG. 4). The receptacle area 04 has a recess 05 in which the electronics module 03 can be positioned. The recess 05 simultaneously saves axial installation space, because the electronics module 03 can be partially countersunk in the thickness of the connecting element 01. In modified embodiments, the electronics module 03 can be provided with a recess, in order to enable a space-saving arrangement of the electronics module 03 in the connecting element 01. Alternatively, both electronics module 03 and also connecting element 01 can be provided with corresponding recesses. In the receptacle area 04 there are multiple first electrical contact points 07. Electrical contact points 08 (see FIG. 6) of the electronics module 03 can be connected at these contact points 07.

The base part 02 has a first and a second end region 09, 10 that enclose an obtuse angle with the receptacle area 04 in the shown embodiment. However, there is no limitation to such embodiments of the connecting element 01 and other suitable embodiments are definitely possible. The end regions 09, 10 each have a section 12, 13 that is recessed relative to the main plane of extension and are constructed, in particular, as material tapering. The first end region 09 has a first recessed section 12 on the top side, while the second end region 09 comprises a second recessed section 13 on the bottom side. On the top side of the first recessed section 12 and on the bottom side of the second recessed section 13 there are second electrical contact points 14 along a circular path in the form of ring segments. Other connecting elements 01 can be connected at these second electrical contact points 14. The recessed sections 12, 13 are preferably constructed such that the end regions 09, 10 of connecting elements 01 in line with each other can be positioned opposite each other such that the top sides and the bottom sides of the connecting elements 01 are in a plane (see FIG. 5). In particular, the recessed sections can have approximately half the material thickness of the base part in non-recessed areas.

The second electrical contact points 14 are arranged so that the connecting elements 01 in line with each other can be positioned at different angles relative to each other and nevertheless the electrical contact of opposing contact points 14 of adjacent connecting elements is guaranteed. If the second electrical contact points are arranged as segments on a circular path as shown in the illustrated example, then these circular paths have approximately the same diameter on the first end region 09 and on the second end region 10 and the center point of the circular path lies in the rotational axis about which the adjacent connecting elements 01 are rotated relative to each other in order to change their mounting angle $\alpha$.

Figure 3:
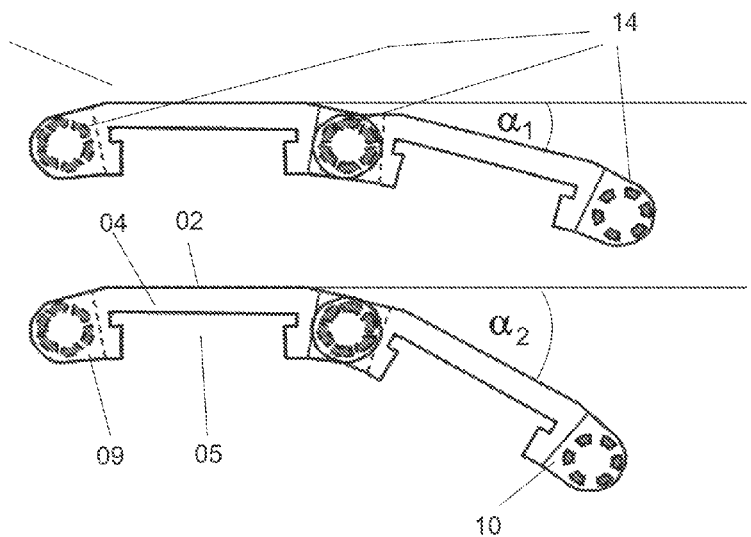
FIG. 3 two connecting elements connected to each other in different mounting angles, FIG. 4 an electronics module arrangement according to the invention in a first embodiment, FIG. 5 the electronics module arrangement according to the invention in a second embodiment, FIG. 6 a detail view of a connecting point between the electronics module and connecting element.

In FIG. 3, two connecting elements 01 connected to each other at different mounting angles $\alpha_1$ and $\alpha_2$ are shown. Due to the adaptability of the mounting angle $\alpha$, a minimal expense adaptation to the available installation space diameter can be realized. The second electrical contact points of adjacent connecting elements 01 can be connected by means of conductive adhesive, soldering, press-fit connection, welding, or crimping. Here, in addition to the electrical connection, preferably also the mechanical connection between the adjacent connecting elements 01 is produced. It is understood that electrical connections must also exist between the first and the second electrical contact points (not shown). Here it is especially advantageous if which first contact point is connected to which second contact point can be selected in an at least partially variable way. This can be enabled, e.g., through suitable conductor guides on the base part, through solder bridges, or through selection switches.

Figure 4:
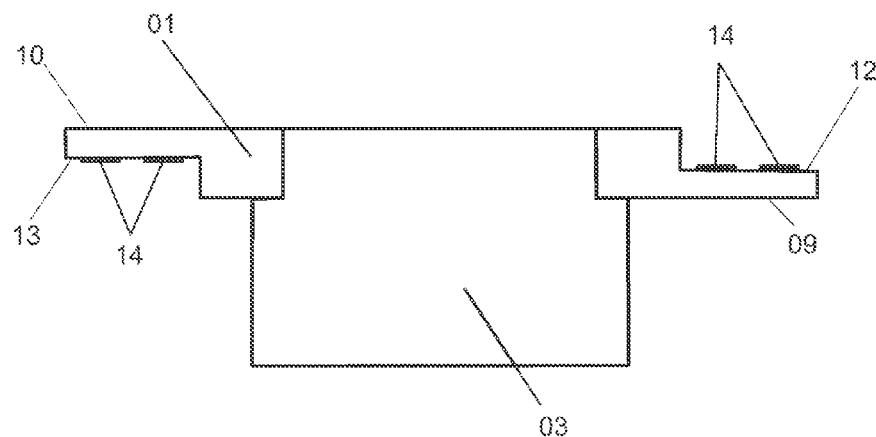

FIG. 4 shows an electronics module arrangement 15 according to the invention in a first embodiment. The electronics module arrangement 15 comprises a connecting element 01 and an electronics module 03 arranged in the receptacle area 04 of the connecting element 01. According to one advantageous embodiment, the electronics modules 03 have a rectangular box-shaped construction. All edges of the rectangular box are preferably less than 15 mm, wherein this does not impart a restriction to electronics modules in this size. If necessary, larger electronics modules are definitely possible. The electronics modules 03 have, on one of their end faces, the electrical contact points 08 that have, for example, a quadratic cross section.

Figure 5:
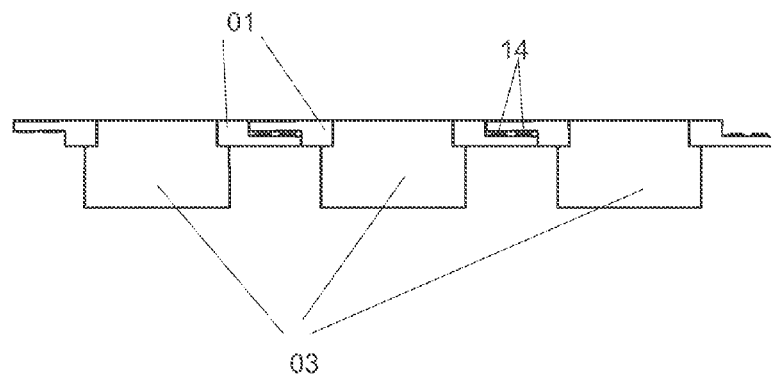

FIG. 5 shows three electronics modules 03 that are connected to each other by means of connecting elements 01.

Figure 6:
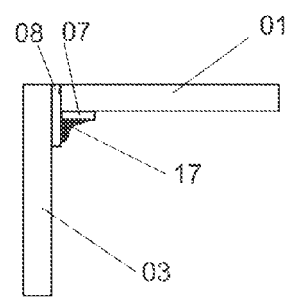

FIG. 6 shows a detailed view of a connecting point between electronics modules 03 and connecting element 01. The electrical contact point 08 of the electronics module 03 is formed of an electrically conductive material. Alternatively, the electrical contact point 08 can also be realized by means of an electrically conductive coating. The electrical contact point 08 of the electronics module 03 is connected to a first contact point 07 of the connecting element by use of a connector element 17 made from an electrically conductive material. The connecting element can be realized, for example, as a metallic alloy (silver-tin solder), composite in an organic matrix (conductive adhesive), or as an individual metal (bonding wire). Someone skilled in the art can easily see that the type of contacting can be adapted. For example, interlocking, microstructured surfaces can be used.

List of Reference Numbers

| | |
|---|---|
| 01 | Connecting element |
| 02 | Base part |
| 03 | Electronics module |

-continued

List of Reference Numbers

| | |
|---|---|
| 04 | Receptacle area |
| 05 | Recess |
| 06 | — |
| 07 | First electrical contact points of the connecting element |
| 08 | Electrical contact points of the electronics module |
| 09 | First end region |
| 10 | Second end region |
| 11 | — |
| 12 | First recessed section |
| 13 | Second recessed section |
| 14 | Second electrical contact points of the connecting element |
| 15 | Electronics module arrangement |
| 16 | — |
| 17 | Connector element |

The invention claimed is:

1. A connecting element for the electrical and mechanical connection of electronics modules comprising a base part with
    a receptacle area used for holding an electronics module, the receptacle area has first electrical contact points for connecting the connecting element to electrical contact points of the electronics module,
    a first end region with a first recessed section on top side thereof and a second end region with a second recessed section on a bottom side thereof, second electrical contact points for connecting to other connecting elements are arranged on the top side of the first recessed section and on the bottom side of the second recessed section, the first and second recessed sections are constructed such that the first and second end regions of connecting elements that are in line with each other are positioned opposite each other such that the top sides and the bottom sides of the adjacent connecting elements each lie in a plane, and the second electrical contact points are arranged so that the adjacent connecting elements that are positioned at different angles ($\alpha$) to each other maintain the contact between opposite second contact points.

2. The connecting element according to claim 1, further comprising a positioning element for positioning the connecting element in a carrier.

3. The connecting element according to claim 1, wherein the second electrical contact points of the adjacent connecting elements are connected by at least one of a conductive adhesive, soldering, press-fit connection, welding, or crimping.

4. An electronics module arrangement for installing in a cylindrical installation space comprising a connecting element according to claim 1, wherein and an electronics module arranged in the receptacle area of the connecting element.

5. The electronics module arrangement according to claim 4, further comprising multiple ones of the connecting elements connected to each other by the second electrical contact points and one or more of the electronics modules, and a maximum possible number of the electronics modules corresponds to a number of the connecting elements.

6. The electronics module arrangement according to claim 4, wherein the electrical contact points of the electronics module are connected to the first electrical contact points of the connecting elements by a connector element made from an electrically conductive material.

7. The electronics module arrangement according to claim 6, wherein the first electrical contact points of the electronics modules are formed of an electrically conductive material or are realized by an electrically conductive coating.

8. The electronics module arrangement according to claim 5, further comprising a hollow cylindrical carrier that is adapted in diameter to a cylindrical installation space and is insertable into the installation space such that the connecting elements connected to each other are arranged in the carrier in a circumferential direction.

9. The electronics module arrangement according to claim 5, wherein at least one of the connecting elements or the electronics modules have recesses for positioning the connecting element and the electronics module relative to each other.

10. A rolling bearing arrangement comprising a rolling bearing with two concentric bearing rings and rolling bodies arranged between the bearing rings in a rolling body space, and an electronics module arrangement according to claim 4, arranged in a rolling bearing installation space.

* * * * *